(12) United States Patent
Jang et al.

(10) Patent No.: US 12,623,339 B2
(45) Date of Patent: May 12, 2026

(54) ARTICULATED WORK ROBOT DEVICE

(71) Applicant: RAON ROBOTICS Inc., Suwon-si (KR)

(72) Inventors: Hyunseok Jang, Incheon (KR); Kwangmin Jung, Hwaseong-si (KR); Geun Young Jang, Suwon-si (KR); Sang Hyuk Jeon, Suwon-si (KR); Hyun Sik Moon, Siheung-si (KR)

(73) Assignee: RAON ROBOTICS INC., Suwon-si (KR)

( * ) Notice: Subject to any disclaimer, the term of this patent is extended or adjusted under 35 U.S.C. 154(b) by 231 days.

(21) Appl. No.: 18/532,845

(22) Filed: Dec. 7, 2023

(65) Prior Publication Data

US 2024/0351193 A1     Oct. 24, 2024

(30) Foreign Application Priority Data

Apr. 21, 2023    (KR) ........................ 10-2023-0052958
Apr. 21, 2023    (KR) ........................ 10-2023-0052960
Apr. 21, 2023    (KR) ........................ 10-2023-0052975

(51) Int. Cl.
*B25J 9/04*         (2006.01)
*B25J 9/00*         (2006.01)
*B25J 9/16*         (2006.01)

(52) U.S. Cl.
CPC ............. *B25J 9/0084* (2013.01); *B25J 9/042* (2013.01); *B25J 9/1664* (2013.01)

(58) Field of Classification Search
CPC . B25J 9/0084; B25J 9/042; B25J 9/043; B25J 9/1664
See application file for complete search history.

(56) References Cited

U.S. PATENT DOCUMENTS

| | | | | | |
|---|---|---|---|---|---|
| 2005/0217053 | A1* | 10/2005 | Kim | .................. | H01L 21/67742 |
| | | | | | 414/744.5 |
| 2008/0124206 | A1* | 5/2008 | Choi | ................. | H01L 21/67781 |
| | | | | | 700/121 |

(Continued)

FOREIGN PATENT DOCUMENTS

| | | | | |
|---|---|---|---|---|
| JP | 2013-059857 A | 4/2013 | | |
| JP | 2014111310 A | * 6/2014 | ....... | H01L 21/67766 |

(Continued)

OTHER PUBLICATIONS

Korean Office Action for related KR Application No. 10-2023-0052958 mailed Aug. 28, 2024 from Korean Intellectual Property Office.

(Continued)

*Primary Examiner* — Gerald McClain
(74) *Attorney, Agent, or Firm* — Paratus Law Group, PLLC

(57)          ABSTRACT

An articulated work robot device includes a lower body, a bridgehead coupled to a common axis at a first position of the lower body to be rotatable, first and second articulated arms configured to be overlapped with each other up and down and having first ends respectively disposed at second and third positions opposite to each other with respect to the common axis on the bridgehead to be rotatable together through the common axis, first and second plurality of hands respectively coupled at second ends of the first and second articulated arms through scissor links, and first and second composite drive modules disposed in an internal space of the bridgehead and driving the first and second articulated arms and the first and second plurality of hands, respectively.

21 Claims, 17 Drawing Sheets

(56)        References Cited

U.S. PATENT DOCUMENTS

2010/0178147 A1 *  7/2010  Kremerman ............. B25J 9/043
                                           414/800
2016/0133502 A1 *  5/2016  Won ...................... B25J 9/1679
                                           901/46

FOREIGN PATENT DOCUMENTS

| | | | | | |
|---|---|---|---|---|---|
| JP | 2016-016498 | A | | 2/2016 | |
| KR | 20050061925 | A | * | 5/2005 | ............. B25J 9/042 |
| KR | 10-2005-0061925 | A | | 6/2005 | |
| KR | 100527669 | B1 | * | 11/2005 | ....... H01L 21/67745 |
| KR | 10-2008-0048814 | A | | 6/2008 | |
| KR | 20080048814 | A | * | 6/2008 | ....... H01L 21/67781 |
| KR | 101312621 | B1 | * | 10/2013 | ....... H01L 21/67781 |
| KR | 10-1535068 | B1 | | 7/2015 | |
| KR | 20160055010 | A | * | 5/2016 | ....... H01L 21/68707 |
| KR | 102272535 | B1 | * | 7/2021 | ............. B25J 9/043 |
| KR | 102432557 | B1 | * | 8/2022 | .......... B25J 15/0246 |

OTHER PUBLICATIONS

Korean Office Action for related KR Application No. 10-2023-0052960 mailed Aug. 28, 2024 from Korean Intellectual Property Office.
International Search Report for PCT/KR2023/009727 mailed Jan. 16, 2024 from Korean Intellectual Property Office.
Written Opinion of the International Searching Authority for PCT/KR2023/009727 mailed Jan. 16, 2024 from Korean Intellectual Property Office.

* cited by examiner

ARTICULATED WORK ROBOT DEVICE

CROSS-REFERENCE TO PRIOR APPLICATIONS

This application claims priority to Korean Patent Application Nos. 10-2023-0052958 (filed Apr. 21, 2023), 10-2023-0052960 (filed Apr. 21, 2023), and 10-2023-0052975 (filed Apr. 21, 2023), which are all hereby incorporated by reference in their entirety.

BACKGROUND

The present disclosure relates to an articulated work robot technology, and more specifically, to an articulated work robot device in which an arm and a hand can operate independently of each other to implement articulated complex motion.

A vacuum robot, one of the core components of semiconductor vacuum process equipment, has a significant impact on the throughput, footprint, maintainability, and downtime of the entire equipment, so the robot performance, robot structure, and equipment placement layout should be selected to match process characteristics such as particle sensitivity, AWC (Auto Wafer Centering) precision, and process time.

In particular, as the process time increases due to improvements in semiconductor micro-manufacturing technology, a new wafer transfer robot that can reduce the footprint is needed for equipment with a relatively long wafer process time.

PRIOR ART DOCUMENT

Patent Document

Korean Patent No. 10-1535068 (2015 Jul. 2.)

SUMMARY

According to one embodiment of the present disclosure, the present disclosure provides an articulated work robot device in which an arm and a hand can operate independently of each other to implement articulated complex motion.

According to one embodiment of the present disclosure, the present disclosure provides an articulated work robot device that can be driven independently by providing independent motion power for each of an upper and lower axis drives, an articulated arm drive, and a hand drive.

According to one embodiment of the present disclosure, the present disclosure provides an articulated work robot device that can minimize the rotation radius by folding a non-working articulated arm during a common axis rotation.

According to one embodiment of the present disclosure, the present disclosure provides an articulated work robot device that can accurately align each work object by correcting the misalignment of a plurality of hands.

Among embodiments, an articulated work robot device comprises: a lower body; a bridgehead coupled to a common axis at a first position of the lower body to be rotatable; first and second articulated arms configured to be overlapped with each other up and down, and having first ends respectively disposed at second and third positions opposite to each other with respect to the common axis on the bridgehead to be rotatable together through the common axis; first and second plurality of hands respectively coupled at second ends of the first and second articulated arms through scissor links; and first and second composite drive modules disposed in an internal space of the bridgehead and driving the first and second articulated arms and the first and second plurality of hands, respectively.

The lower body may include: an axis control motor for moving the common axis up and down to adjust a height of the bridgehead; and a linear guide disposed vertically outside of the common axis to guide the up-down movement.

The bridgehead may arrange the first to third positions in a triangular shape.

The first articulated arm may operate at a lower side of the second articulated arm and independently drive the first plurality of hands at an upper or lower side of the second end.

The second articulated arm may operate at an upper side of the first articulated arm and independently drive the second plurality of hands at an upper or lower side of the second end.

The first and second articulated arms may be respectively coupled to a plurality of links at the second and third positions, and each of the plurality of links may be axially rotated to implement a complex motion.

The first plurality of hands may be axially coupled to at an upper or lower portion of the second end of the first articulated arm up and down through a first scissor link, and may be disposed at a lower side of the second plurality of hands to be driven independently.

The second plurality of hands may be axially coupled to at an upper or lower portion of the second end of the second articulated arm up and down through a second scissor link, and may be disposed at an upper side of the first plurality of hands to be driven independently.

Each of the first and second plurality of hands may load or unload a work object by fixedly coupling a work tool at a position opposite to an axis of the scissor link.

The first composite drive module may be driven independently of the second composite drive module, and may include: a first articulated control motor connected to a first articulated drive shaft that provides joint motion power for the first articulated arm; a first plurality of hand control motors connected to a first plurality of hand drive shafts that provide independent hand motion power for the first plurality of hands; and a first magnetic fluid seal surrounding the first articulated drive shaft and the first plurality of hand drive shafts.

The second composite drive module may be driven independently of the first composite drive module, and may include: a second articulated control motor connected to a second articulated drive shaft that provides joint motion power for the second articulated arm; a second plurality of hand control motors connected to a second plurality of hand drive shafts that provide independent hand motion power for the second plurality of hands; and a second magnetic fluid seal surrounding the second articulated drive shaft and the second plurality of hand drive shafts.

Among embodiments, the articulated work robot device may further comprise: a control unit that folds at least some of the first and second articulated arms toward the common axis during rotation of the bridgehead.

The control unit may fold a non-working articulated arm of the first and second articulated arms.

The control unit may simultaneously process a plurality of wafers in a first work chamber by overlapping the plurality of corresponding hands in a work progressing articulated arm of the first and second articulated arms up and down.

The control unit may simultaneously process a plurality of wafers in a second work chamber by spreading the plurality of corresponding hands in a work progressing articulated arm of the first and second articulated arms left and right.

During a work process, the control unit may fold a work arm corresponding to one of the first and second articulated arms to position the work arm in the first position and unfold the work arm to perform the articulated motion simultaneously while independently driving the plurality of work hands coupled to the work arm.

Among embodiments, the articulated work robot device may further comprise: an alignment operation performing unit that corrects a degree of misalignment of the plurality of hands based on rotation degrees of the plurality of hands and entry and exit time points of work objects in the plurality of hands.

The alignment operation performing unit may include: a plurality of encoders for obtaining the rotation degrees of the plurality of hands; a plurality of laser transceivers disposed in an entry direction of the arm to detect the entry and exit time points of the work objects in the plurality of hands during movement of the arm; and a control unit that corrects the degree of misalignment of the plurality of hands based on the rotation degrees of the plurality of hands and the entry and exit time points of the work objects.

The plurality of encoders may detect a rotation angle in a first direction with respect to an axis formed by the scissor link for a first hand among the plurality of hands, and detect a rotation angle in a second direction, corresponding to a direction opposite to the first direction, with respect to the axis for a second hand among the plurality of hands.

The plurality of optical transceivers may be disposed on both sides of a center of the entry direction of the arm, so that when the plurality of hands enter after being spread by a first angle, the plurality of hands may be perpendicular to the entry direction and the plurality of optical transceivers may detect the entry and exit time points of the work objects by transmitting and receiving light in a transmission and reception direction that is not necessarily perpendicular.

The plurality of optical transceivers may detect time points when the reception of the light is interrupted as the entry time points, and detect time points when the interruption of the light reception is released and the light is received as the exit time points.

Among embodiments, an articulated work robot device comprises: a lower body; a bridgehead coupled to a common axis at a first position of the lower body to be rotatable; first and second articulated arms that are operated independently of each other in a work process and rotate together through the common axis; and first and second plurality of hands in which first ends of first and second links are axially coupled together at second ends of the first and second articulated arms, respectively, and independently operable work tools are coupled to second ends of the first and second links, respectively.

Among embodiments, an articulated work robot device comprises: a bridgehead coupled to a common axis at a first position of a lower body to be rotatable; first and second plurality of hands respectively coupled through scissor links and configured to be overlapped with each other up and down; first and second articulated arms that are disposed up and down when overlapped with each other, and have first ends coupled to second and third positions of the bridgehead, respectively, and second ends coupled to the first and second plurality of hands, respectively, to perform articulated motions; and first and second composite drive modules that are respectively associated with the second and third positions and drive the articulated arms and the plurality of hands at the corresponding positions, respectively.

Among embodiments, an articulated work robot device comprises: a plurality of hands that are coupled to a common axis to be overlapped up and down and load work objects; a plurality of optical transceivers that are arranged to deviate from a center of an entry direction of the plurality of hands and detect entry and exit time points of the work objects when the plurality of hands enter while being spread by a first angle; and a control unit that corrects a degree of misalignment for the spreading of the plurality of hands based on the entry and exit time points of the work objects.

The disclosed technology can have the following effects. However, it is not intended to mean that a specific embodiment should include all of the following effects or only the following effects, and the scope of the disclosed technology should not be understood as being limited thereby.

The articulated work robot device according to one embodiment of the present disclosure can implement complex articulated motion by driving the arm and the hand independently of each other.

The articulated work robot device according to one embodiment of the present disclosure can provide independent motion power for each of the upper and lower axis drives, the articulated arm drive to be all driven independently.

The articulated work robot device according to one embodiment of the present disclosure can minimize the rotation radius by folding the non-work articulated arm during the common axis rotation.

The articulated work robot device according to one embodiment of the present disclosure can accurately align each work object by correcting the misalignment of the plurality of hands.

BRIEF DESCRIPTION OF THE DRAWINGS

FIGS. 3 and 4 are respectively a perspective view and a cross-sectional view for explaining a lower body in FIG. 1.

DETAILED DESCRIPTION

Figure 1:
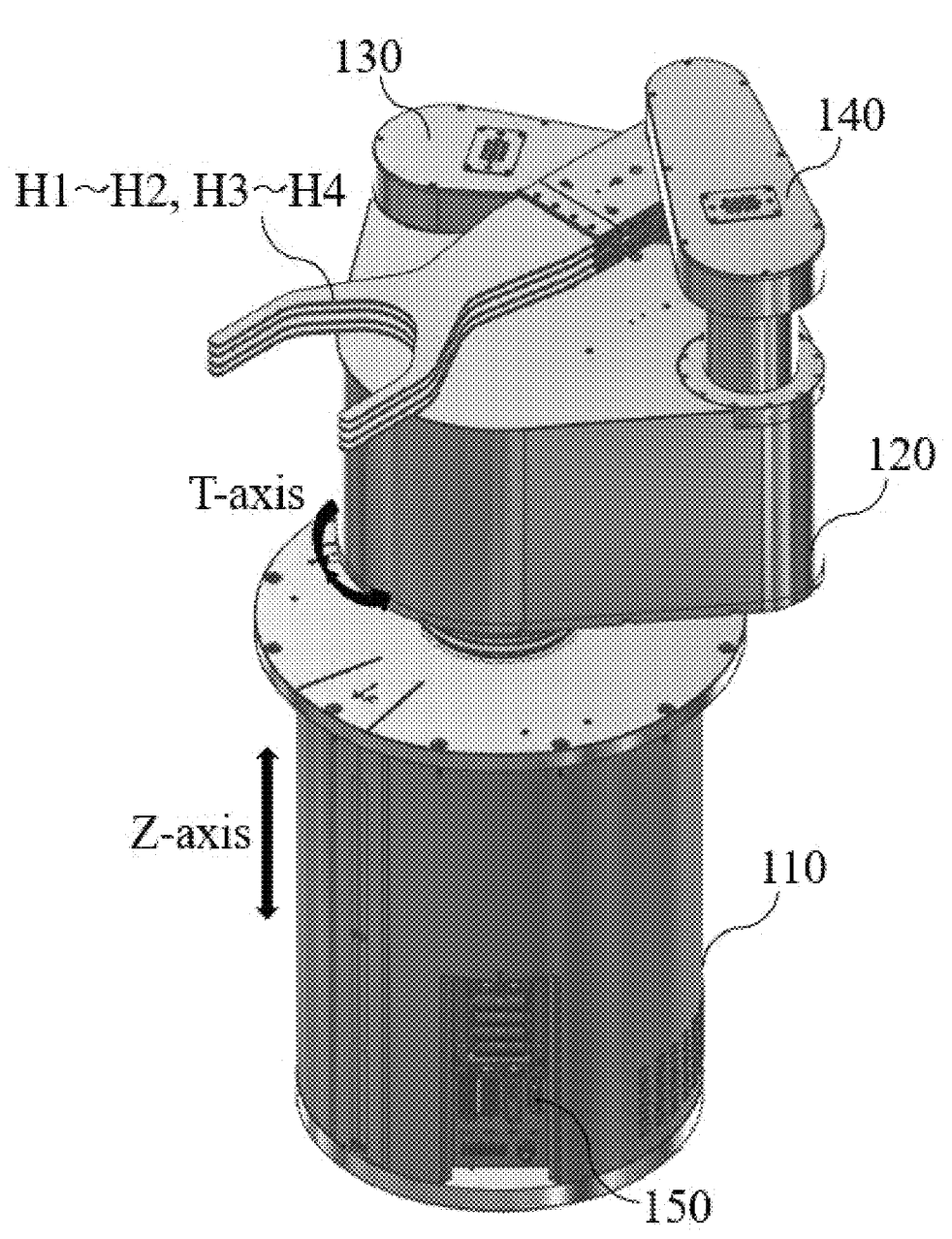
FIGS. 1 and 2 are perspective views illustrating an articulated work robot device according to one embodiment of the present disclosure.

The description of the present disclosure is only an example for structural or functional explanation, and the scope of the present disclosure should not be construed as limited by the embodiments described herein. In other words, the embodiments can be modified in various ways and can have various forms, and the scope of the present disclosure should be understood to include equivalents that can realize the technical idea. In addition, the purpose or effect presented in the present disclosure does not mean that a specific embodiment should include all or only such effects, so the scope of the present disclosure should not be understood as limited thereby.

Meanwhile, the meaning of the terms described in the present specification should be understood as follows.

The terms such as "first", "second", etc. are intended to distinguish one component from another component, and the scope of the present disclosure should not be limited by these terms. For example, a first component may be named as a second component, and similarly, the second component may also be named as the first component.

When it is described that a component is "connected" to another component, it should be understood that one component may be directly connected to another component, but that other components may also exist between them. On the other hand, when it is described that a component is "directly connected" to another component, it should be understood that there is no other component between them. Meanwhile, other expressions that describe the relationship between components, such as "between" and "immediately between" or "neighboring" and "directly neighboring" should be interpreted similarly.

Singular expressions should be understood to include plural expressions unless the context clearly indicates otherwise, and terms such as "comprise", "include", and "have" are intended to specify the existence of implemented features, numbers, steps, operations, components, parts, or combinations thereof, but should be understood as not precluding the possibility of the existence or addition of one or more other features, numbers, steps, operations, components, parts, or combinations thereof.

For each step, identification codes (e.g., a, b, c, etc.) are used for convenience of explanation. The identification codes do not explain the order of the steps, and the steps may occur in a different order from the order specified clearly unless a specific order is not clearly described in context. That is, the steps may occur in the same order as specified, may be performed substantially simultaneously, or may be performed in the reverse order.

All terms used herein, unless otherwise defined, have the same meaning as commonly understood by a person of ordinary skill in the field to which the present disclosure pertains. Terms defined in commonly used dictionaries should be interpreted as consistent with the their contextual meaning in the related art, and are no be interpreted as having an ideal or unduly formal meaning unless expressly defined in the present specification.

Figure 2:
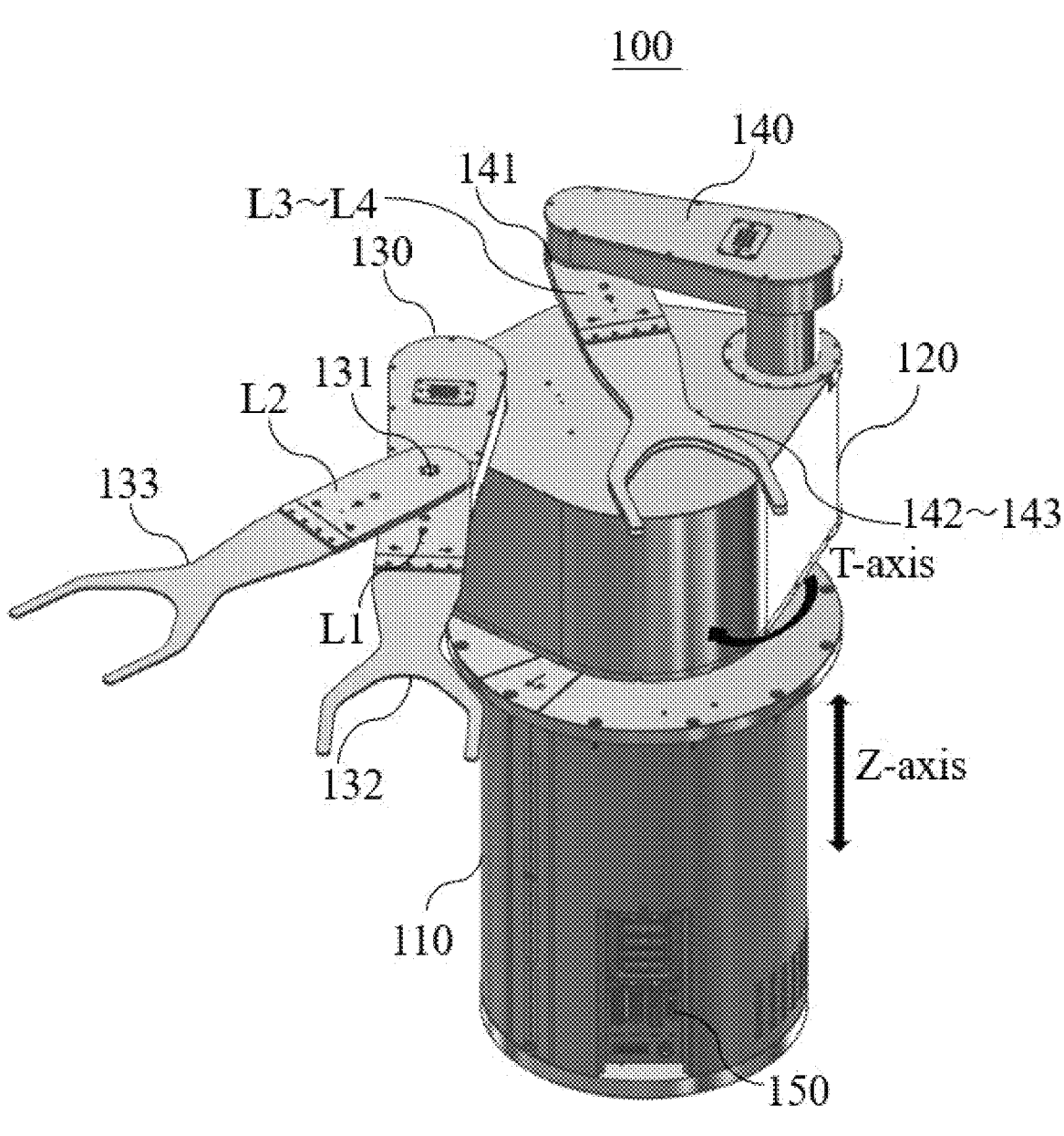

FIGS. 1 and 2 are perspective views illustrating an articulated work robot device according to one embodiment of the present disclosure.

Referring to FIGS. 1 and 2, an articulated work robot device 100 may include a lower body 110, a bridgehead 120, first and second articulated arms 130, 140, first and second plurality of hands H1 to H2, H3 to H4, and a control unit 150.

The lower body 110 constitutes a lower part of the articulated work robot device 100. The lower body 110 forms a common axis T that rotates an upper part of the articulated work robot device 100 and is rotatably coupled to the bridgehead 120.

The bridgehead 120 is coupled to the common axis T at a first position of the lower body 110 to be rotatable. The first and second articulated arms 130, 140 are disposed on the bridgehead 120 and can rotate together through the common axis T. In addition, the bridgehead 120 has an internal space and can be moved up and down by up-down movement of the common axis T.

The first and second articulated arms 130, 140 may be overlapped up and down on each other, and first ends thereof are respectively disposed on the bridgehead 120 at second and third positions opposite to each other with respect to the common axis T, so that they can be operated independently of each other during the work process. The first and second articulated arms 130, 140 may rotate together through the common axis T. The first and second plurality of hands H1 and H2, H3 and H4 may be coupled to second ends of the first and second articulated arms 130, 140, respectively.

The first and second plurality of hands H1 and H2, H3 and H4 may be coupled through scissor links 131, 141 at the second ends of the first and second articulated arms 130, 140, respectively. In one embodiment, in the first and second plurality of hands H1 and H2, H3 and H4, first ends of first and second links L1 and L2, L3 and L4 may be axially coupled together at the second ends of the first and second articulated arms 130, 140, respectively, and independently operable work tools 132 and 133, 142 and 143 may be coupled to second ends of the first and second links L1 and L2, L3 and L4, respectively.

The control unit 150 may fold at least some of the first and second articulated arms 130, 140 toward the common axis T during the rotation of the bridgehead 120.

The articulated work robot device 100 may allow the first and second articulated arms 130, 140 to operate independently of each other. As shown in FIG. 1, the articulated work robot device 100 may overlap both the first and second plurality of hands H1 and H2, H3 and H4 up and down. In addition, as shown in FIG. 2, the articulated work robot device 100 may spread the first plurality of hands H1 to H2 on the first articulated arm 130 of the first and second articulated arms 130, 140 left and right, and may fold the remaining second articulated arm 140 toward the common axis T and overlap the second plurality of hands H3 and H4 on the second articulated arm 140 up and down.

The articulated work robot device 100 may include a total of eight axes. The articulated work robot device 100 includes a T-axis formed by the rotational drive of the bridgehead 120, a Z-axis formed by the up-down drive of the bridgehead 120, two R-axes formed by driving of the first and second articulated arms 130, 140, and four-H-axes formed by driving of the first and second plurality of hands H1 and H2, H3 and H4.

Figure 3:
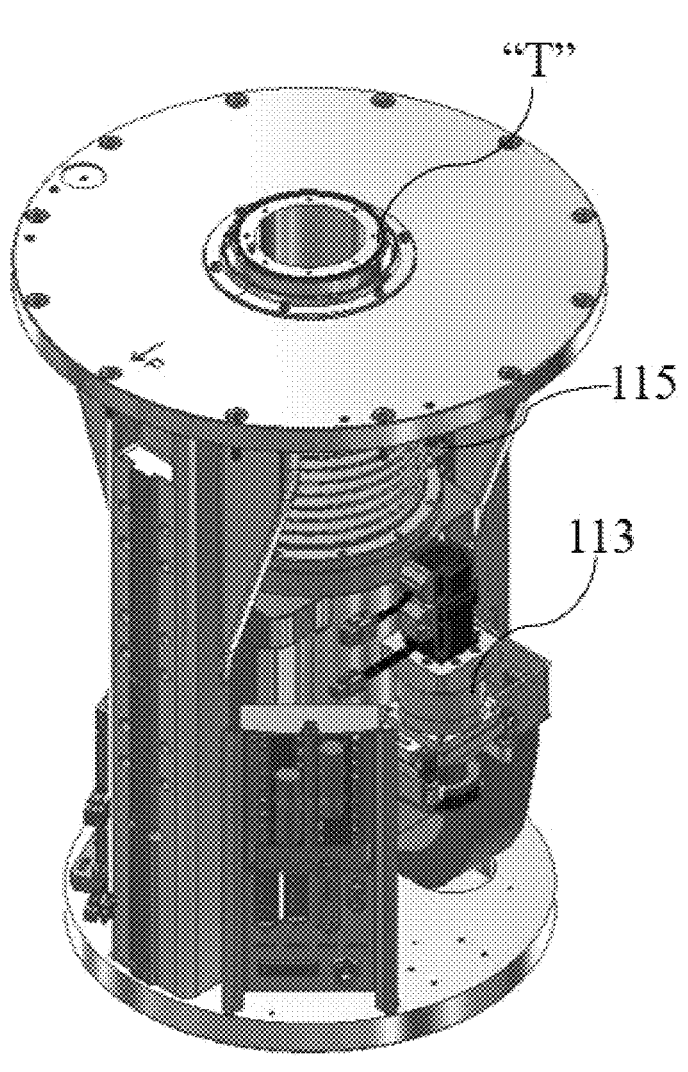
Figure 4:
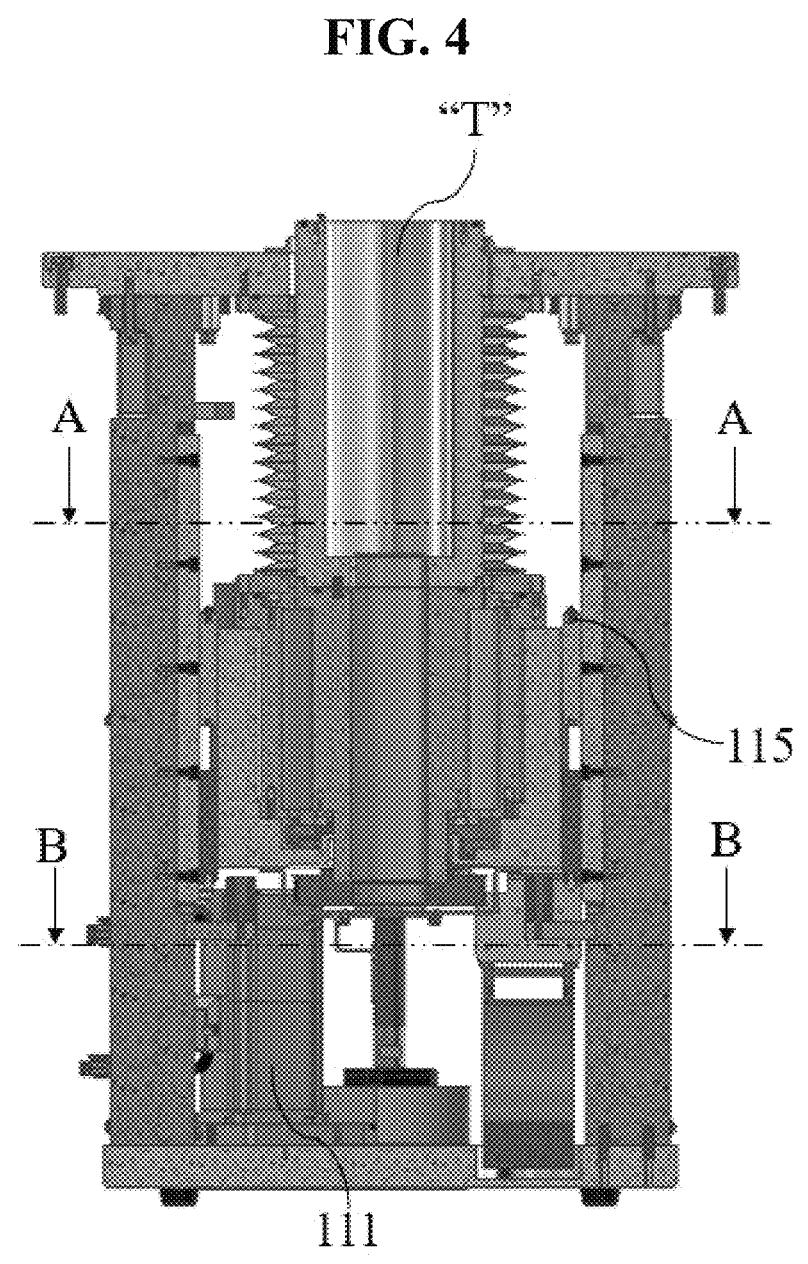
Figure 5A:
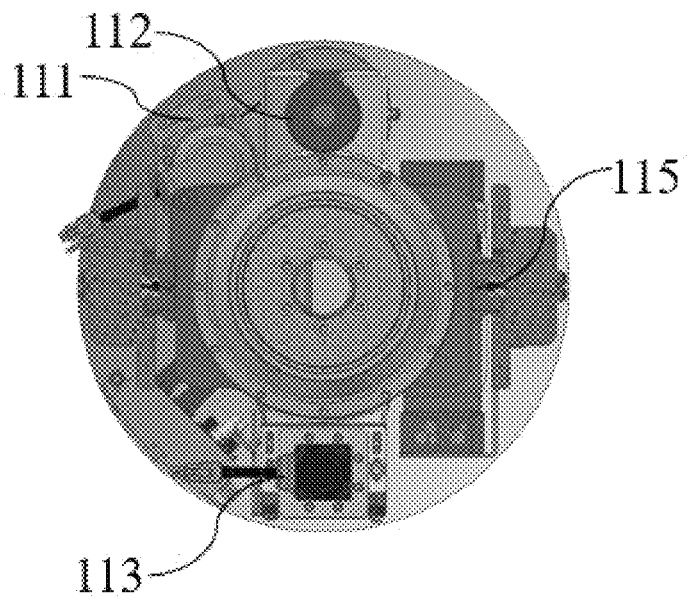
FIGS. 5A and 5B are plan views showing sections A-A and B-B of FIG. 4, respectively.
Figure 5B:
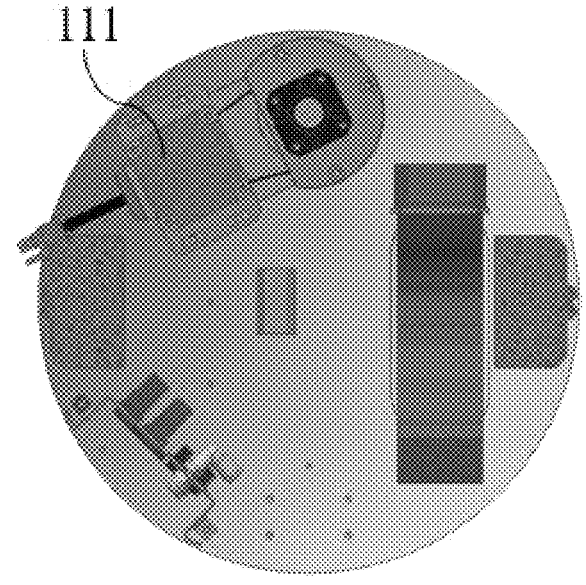

FIGS. 3 and 4 are respectively a perspective view and a cross-sectional view illustrating the lower body in FIG. 1, and FIGS. 5A and 5B are plan views showing sections A-A and B-B of FIG. 4.

Referring to FIGS. 3 to 5B, the lower body 110 includes a common axis T, first and second axis control motors 111, 113, and a linear guide 115.

The common axis T is a central rotation axis of the articulated work robot device 100, and rotatably couples the bridgehead 120.

The first axis control motor 111 may adjust a height of the bridgehead 120 by moving the common axis T up and down through axis control. The first axis control motor 111 is disposed outside of the common shaft T and may provide rotational force to the common shaft T. The first axis control motor 111 is disposed outside of the common shaft T at a lower position and may move the common shaft T up and down by converting the rotational motion of the motor into linear motion through a ball screw 112. The second axis control motor 113 may rotate the bridgehead 120 by rotating the common shaft T. The second axis control motor 113 may be disposed outside of the common axis T and may provide rotational force to the common axis T to rotate the bridgehead 120 coupled to the common axis T, thereby rotating all of the arms of the articulated work robot device 100.

The linear guide 115 is arranged vertically outside of the common axis T and may guide up-down movement of the common axis T. The linear guide 115 may be disposed on both sides of the outside of the common axis T to support the common axis T as it moves up and down.

Figure 6:
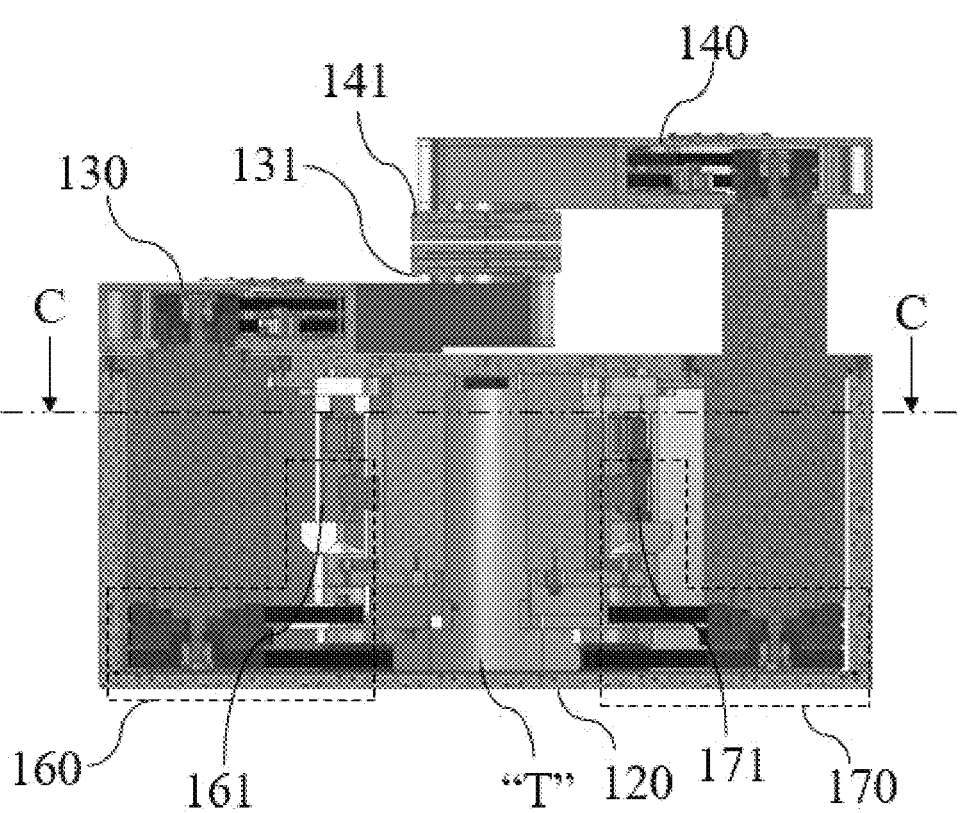
FIGS. 6 and 7 are cross-sectional views for explaining the structures of first and second articulated arms in FIG. 1.
Figure 7:
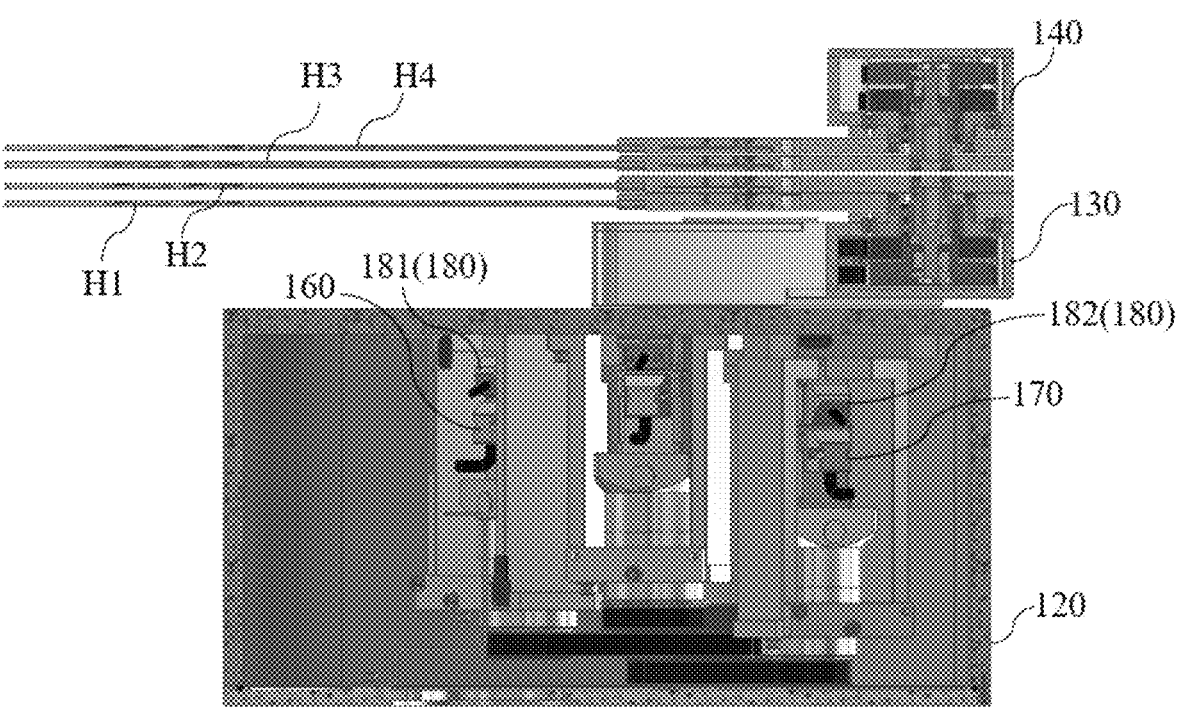
Figure 8:
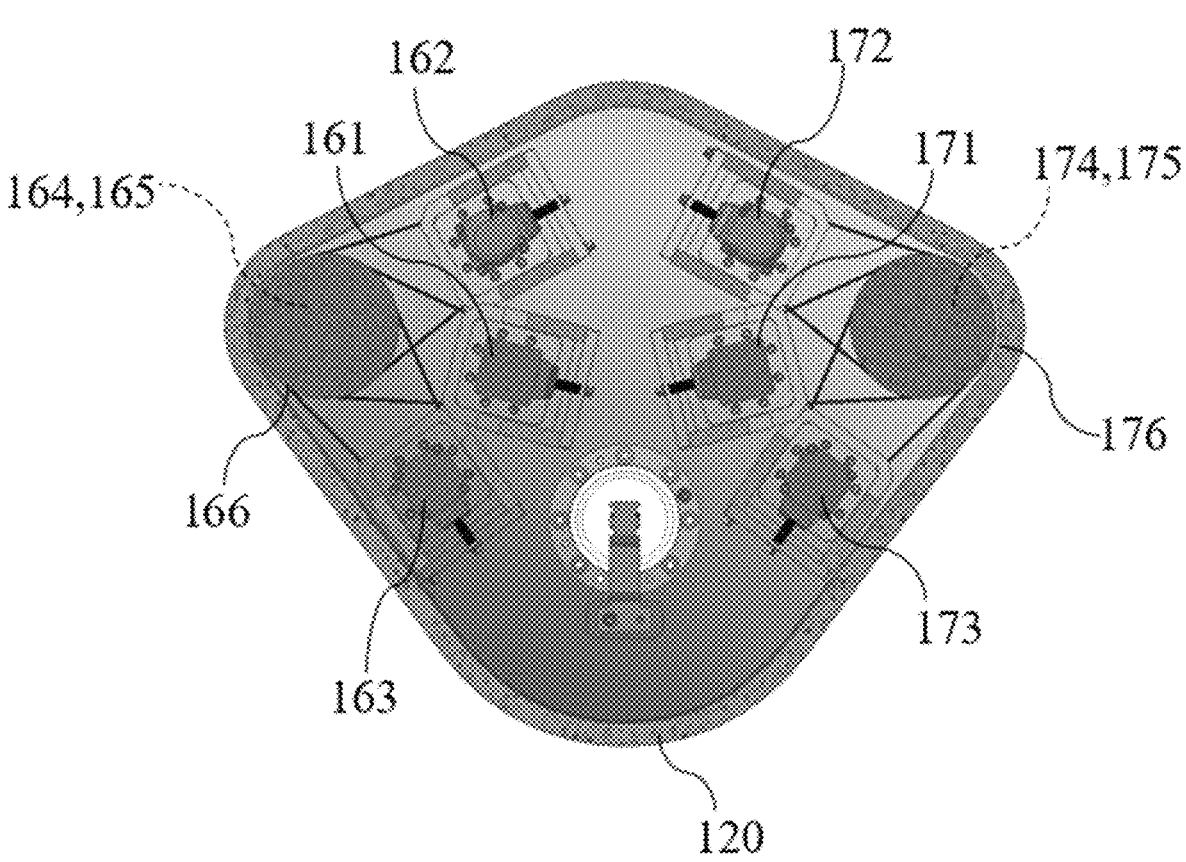
FIG. 8 is a plan view showing section C-C of FIG. 6.
Figure 9:
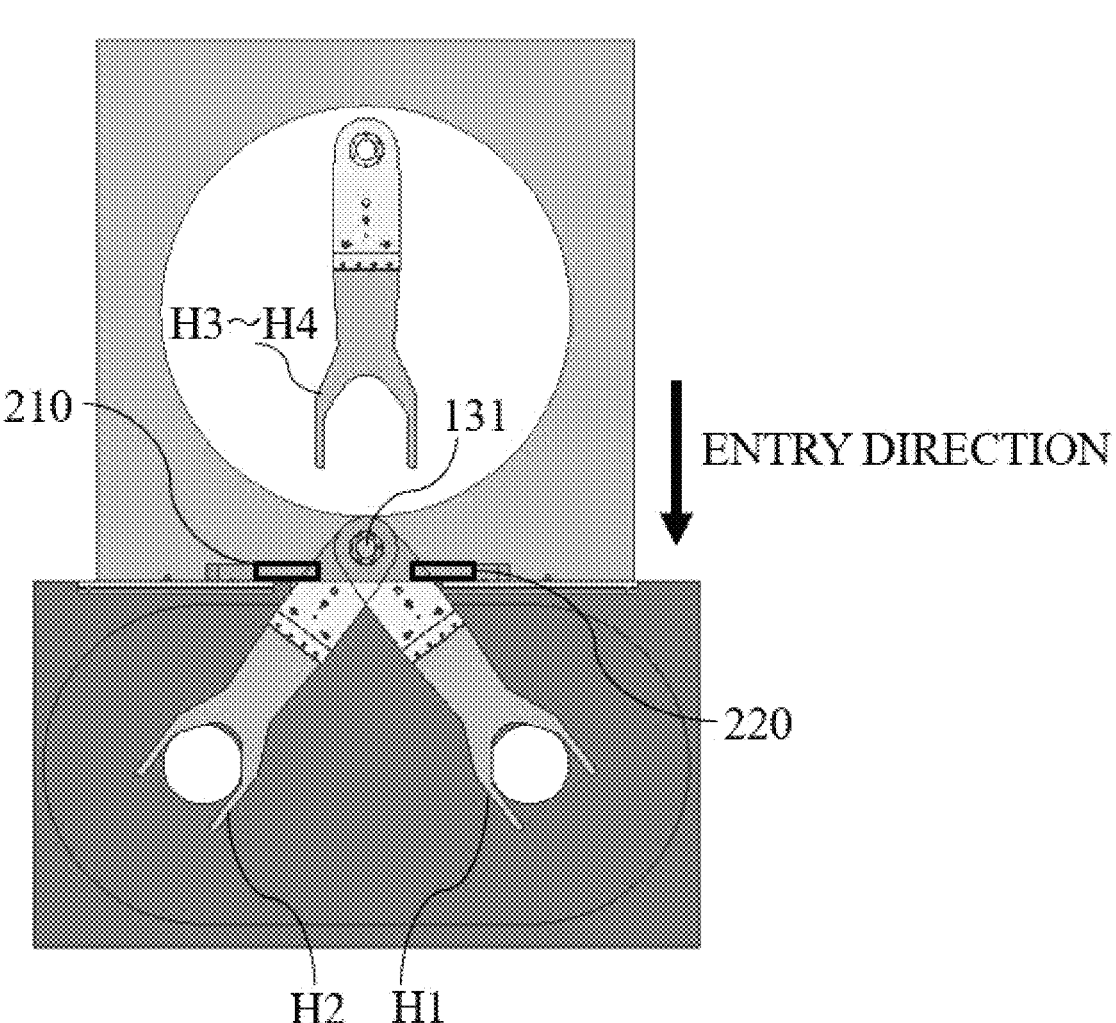
FIG. 9 is a diagram for explaining the alignment control structure of the articulated work robot device in FIG. 1.

FIGS. 6 and 7 are cross-sectional views for explaining the structure of the first and second articulated arms in FIG. 1, FIG. 8 is a plan view showing section C-C of FIG. 6, and FIG. 9 is a diagram for explaining the alignment control structure of the articulated work robot device in FIG. 1.

Referring to FIGS. 6 to 8, the articulated work robot device 100 has the bridgehead 120 rotatably coupled to an upper portion of the lower body 110.

The bridgehead 120 has an internal space and is rotatable by being coupled to the common axis T at a first position of the lower body 110. In addition, the bridgehead 120 may be raised and lowered by the up-down movement of the common axis T.

In this case, the common axis T is the central rotation axis of the articulated work robot device 100, and rotatably couples the bridgehead 120. The first and second articulated arms 130, 140 are disposed on the bridgehead 120 and may rotate together through the common axis T. The bridgehead 120 may be coupled to the common axis T between the first and second articulated arms 130, 140 to rotate the first and second articulated arms 130, 140 together.

The first and second articulated arms 130, 140 may be overlapped with each other, and may be respectively coupled to second and third positions opposite each other with respect to the common axis T on the bridgehead 120, so that they are operated independently of each other during the work process. The first and second articulated arms 130, 140 may be arranged up and down when overlapped with each other, and may rotate together through the common axis T. The first ends of the first and second articulated arms 130, 140 are coupled at the opposite second and third positions of the bridgehead 120, respectively, and the second ends may be coupled to the first and second plurality of hands H1 and H2, H3 and H4 to perform articulated motion.

In one embodiment, the first and second articulated arms 130, 140 may be disposed at a height difference such that a wafer as a work object can be loaded on at least one of the first and second plurality of hands H1 and H2, H3 and H4, and they can be overlapped up and down. For example, the first articulated arm 130 may be a lower arm in terms of height than the second articulated arm 140, and the second articulated arm 140 may be an upper arm. The first articulated arm 130 operates at the lower side of the second articulated arm 140, and may independently drive the first plurality of hands H1 and H2 at an upper or lower side of the second end. The second articulated arm 140 operates at the upper side of the first articulated arm 130, and may independently drive the second plurality of hands H3 and H4 at the upper or lower side of the second end. In this case, the bridgehead 120 may arrange the first to third positions in a triangular shape. That is, the bridgehead 120 may be implemented to form an isosceles triangle with the same length between the common axis T and each of the first and second articulated arms 130, 140 through virtual straight lines of the first to third positions.

The first and second plurality of hands H1 and H2, H3 and H4 may be respectively coupled through scissor links 131, 141 and may be overlapped with each other up and down. Among the first and second plurality of hands H1 and H2, H3 and H4, the first plurality of hands H1 and H2 are axially coupled at an upper or lower portion of the second end of the first articulated arm 130 up and down through the scissor link 131, and are disposed at a lower side the second plurality of hands H3 and H4 to be driven independently. In this case, the first plurality of hands H1 and H2 are axially coupled to the upper portion of the second end of the first articulated arm 130 up and down, and the first plurality of hands H1 and H2 may be axially coupled to the lower portion of the second end of the first articulated arm 130 as desired. Among the first and second plurality of hands H1 and H2, H3 and H4, the second plurality of hands H3 and H4 may be axially coupled to an upper or lower portion of the second end of the second articulated arm 140 up and down, and may be disposed at an upper side of the first plurality of hands H1 and H2 to be driven independently. In this case, the second plurality of hands H3 and H4 are axially coupled to the lower portion of the second end of the second articulated arm 140 up and down, and the second plurality of hands H3 and H4 may be axially coupled to the upper portion of the second end of the second articulated arm 140 as desired.

The first and second plurality of hands H1 and H2, H3 and H4 may load or unload a work object by fixedly coupling the work tools 132 and 133, 142 and 143 at positions opposite to the axes of the scissor links 131, 141, respectively.

First and second composite drive modules 160, 170 are respectively disposed at second and third positions in the internal space of the bridgehead 120 and drive the corresponding articulated arm and the corresponding plurality of hands. In this case, the first and second composite drive modules 160, 170 are respectively disposed in the inner space of the bridgehead 120 at the second and third positions opposite to each other with respect to the common axis T and driven independently of each other. In one embodiment, the first composite drive module 160 is disposed at the second position in the internal space of the bridgehead 120, and axially connected to the first articulated arm 130 and the first plurality of hands H1 and H2 coupled to the second position on the bridgehead 110 to independently provide joint motion power for the first articulated arm 130 and hand motion power for the first plurality of hands H1 and H2. The second composite drive module 170 is disposed at the third position in the internal space of the bridgehead 120, and axially connected to the second articulated arm 140 and the second plurality of hands H3 and H4 coupled to the third position on the bridgehead 120 to independently provide joint motion power for the second articulated arm 140 and hand motion power for the second plurality of hands H3 and H4.

The first composite drive module 160 is driven independently of the second composite drive module 170, and includes a first articulated control motor 161 and a first plurality of hand control motors 162, 163 to drive the first articulated arm 130 and the first plurality of hands H1 and H2.

The first articulated control motor 161 is connected to a first articulated drive shaft 164 and provides joint motion power for the first articulated arm 130. The first plurality of hand control motors 162, 163 are connected to first plurality of hand drive shafts 165 to provide independent hand motion of the first plurality of hands H1 and H2. In this case, the first articulated drive shaft 164 and the first plurality of hand drive shafts 165 may be surrounded by a first magnetic fluid seal 166 and maintained in a vacuum state.

The second composite drive module 170 is driven independently of the first composite drive module 160, and includes a second articulated control motor 171 and a second plurality of hand control motors 172, 173 to drive the second articulated arm 140 and the second plurality of hands H3 and H4.

The second articulated control motor 171 is connected to a second articulated drive shaft 174 and provides joint motion power for the second articulated arm 140. The second plurality of hand control motors 172, 173 are connected to second plurality of hand drive shafts 174 to provide independent hand motion power for the second plurality of hands H3 and H4. In this case, the second articulated drive shaft 174 and the second plurality of hand drive shafts 175 may be surrounded by a second magnetic fluid seal 176 and maintained in a vacuum state.

In this case, the first and second composite drive modules 160, 170 are configured to surround the outside of the articulated drive shaft and the plurality of hand drive shafts with the magnetic fluid seal, but are not necessarily limited thereto and may use a vacuum barrier thin film to maintain the vacuum state.

The first and second articulated arms 130, 140 may be operated independently of each other during the work process by joint motion power provided from the first and second articulated control motors 161, 171, respectively. The first and second plurality of hands H1 and H2, H3 and H4 may also be independently driven by hand motion power provided from the first and second plurality of hand control motors 162 and 163, 172 and 173, respectively. The first and second articulated control motors 161, 171 and the first and second plurality of hand control motors 162 and 163, 172 and 173 are connected to respective driving pulleys to provide motion power to the corresponding articulated arms and hands.

The control unit 150 rotates the first and second articulated arms 130, 140 disposed on the bridgehead 120 to perform a wafer loading or unloading operation for a work chamber. The control unit 150 may fold the non-working articulated arm among the first and second articulated arms 130, 140 to minimize the turning radius. The control unit 150 may simultaneously process a plurality of wafers in a first work chamber by overlapping the plurality of corresponding hands on the work progressing articulated arm among the first and second articulated arms 130, 140 up and down. In this case, the first work chamber may include a load lock chamber. The control unit 150 may load or unload a plurality of wafers in the load lock chamber by overlapping the plurality of corresponding hands on the articulated arm in a working position. In addition, the control unit 150 may process a plurality of wafers in a second work chamber by spreading the plurality of corresponding hands on the work progressing articulated arms among the first and second articulated arms 130, 140 left and right. In this case, the second working chamber may include a process chamber. The control unit 150 may load or unload a plurality of wafers into the process chamber by spreading the plurality of hands on the work progressing articulated arm left and right.

In one embodiment, the control unit 150 may fold the work arm corresponding to one of the first and second articulated arms 130, 140 during the work process to position it in the first position, and unfold the work arm to perform an articulated motion during a work process and drive the plurality of work hands coupled to the work arm independently. In this case, the control unit 150 is a controller for motion control of the first and second articulated arms 130, 140, which may be mounted on the lower body 110 of the corresponding robot or may be configured as an external, independent equipment.

Meanwhile, the articulated work robot device 100 may perform alignment control for correcting the misalignment of the plurality of hands since there may be a difference in motion between the plurality of hands depending on the degree of misalignment thereof, which may cause misalignment of work objects in the plurality of hands. To this end, the articulated work robot device 100 may include an alignment operation performing unit 180.

The alignment operation performing unit 180 may include a plurality of encoders 181, 182 and a plurality of optical transceivers 210, 220.

The plurality of encoders 181, 182 may obtain the degree of rotation of the first and second plurality of hands H1 and H2, H3 and H4 based on the scissor links 131, 141 forming a common axis. In one embodiment, the plurality of encoders 181, 182 may be coupled to the common axis and detect the degree of rotation of each of the first and second plurality of hands H1 and H2, H3 and H4. In this case, the plurality of encoders 181, 182 may be coupled to the corresponding motors of the first and second composite drive modules 160, 170 that provide power to the first and second plurality of hands H1 and H2, H3 and H4.

Among the plurality of encoders 181, 182, the encoder 181 may detect the rotation angle of the first hand H1 among the plurality of hands H1 and H2 in a first direction with respect to the common axis. The encoder 181 may detect the rotation angle in a second direction with respect to the common axis in the case of the second hand H2 of the plurality of hands H1, H2. In this case, the second direction may correspond to a direction opposite to the first direction. For example, when the plurality of hands H1, H2 on the arm 130 are spread left and right based on the common axis by the power provided by the first composite drive module 160, the encoder 181 may detect a rotation angle in the left direction of the first hand H1 with respect to the common axis, and a rotation angle in the right direction of the second hand H2 with respect to the common axis.

The plurality of optical transceivers 210, 220 may be disposed in an entry direction of the arm 130 and detect the entry and exit points of work objects in the plurality of hands H1, H2 during the movement of the arm 130. The plurality of optical transceivers 210, 220 are disposed on both sides of the center of the entry direction of the arm 130 and transmit and receive light to detect entry and exit points of the work objects. The plurality of optical transceivers 210, 220 may be configured as an optical transmitter and an optical receiver, respectively. The optical transmitter and the optical receiver may be arranged to face each other, and the light from the optical transmitter may be detected by the optical receiver. Of the plurality of optical transceivers 210, 220, the optical transmitter may include a laser diode as a light source part, and the optical receiver may include a photo detector as a light receiving part.

The plurality of optical transceivers 210, 220 may be arranged perpendicular to the entry direction when the plurality of hands H1, H2 enter after being spread by a first angle, and transmit and receive light to detect time points when the reception of light is interrupted as entry time points and time points when the interruption of light reception is released and the light is received as exit time points. In this case, the light transmission and reception direction is not necessarily perpendicular. For example, some of the plurality of optical transceivers 210, 220 may transmit and receive light in a perpendicular direction and others may transmit and receive light in an oblique direction to set a section for detecting entry and exit time points of work objects. In one embodiment, the plurality of optical transceivers 210, 220 are arranged to be deviated from the center of the entry direction of the plurality of hands H1, H2 to detect the entry and exit time points of the work objects when the plurality of hands H1, H2 spread by the first angle and then enter.

The control unit 150 may correct the degree of misalignment of the plurality of hands H1, H2 based on the rotation degrees of the plurality of hands H1, H2 and the entry and exit time points of the work objects. During the entry process of the arm 130, the control unit 150 causes the plurality of hands H1, H2 to enter in a state in which the hands H1, H2 are spread by the first angle from in a state in which the hands H1, H2 are overlapped up and down. In this case, the first angle refers to a minimum angle of the plurality of hands H1, H2 spread left and right that the plurality of optical transceivers 210, 220 can detect the entry time point for each of the work objects in the plurality of hands H1, H2. In one embodiment, the control unit 150 may cause the arm 130 to enter in a state in which each of the plurality of hands H1, H2 is spread left and right by an angle between 1 and 2 degrees, preferably at an angle of 1.25 degrees, from the center of the entry direction to detect each of the work objects during the entry process of the arm 130.

The control unit 150 may calculate the degree of misalignment of each of the plurality of hands H1, H2 based on the rotation degrees of the plurality of hands H1, H2 and the entry and exit time points of the work objects. The misalignment of the plurality of hands H1, H2 may occur for various reasons, such as shaking during the movement of the arm 130 or rotation deviation of the hands. In one embodiment, the control unit 150 may determine the degree of misalignment of each of the plurality of hands H1, H2 according to the deviation of the entry or exit time points of the work objects based on the rotation degrees of the plurality of hands H1, H2. The control unit 150 may determine the misalignment of the plurality of hands H1, H2 based on the deviation of the entry and exit time points of the work objects, that is, based on the simultaneous detection of the entry and exit time points of the work objects by the plurality of optical transceivers 210,220. The control unit 150 may control the first and second directional rotation of each of the plurality of hands H1, H2 through the first composite drive module 160 to perform misalignment correction.

When the degree of misalignment of the plurality of hands H1, H2 is corrected, the control unit 150 spreads the plurality of hands H1, H2 by a second angle and proceeds with the entry of the arm 130 to unload the work objects to specific positions.

In the above, the description is made for convenience based on the plurality of hands H1, H2 in the first arm 130, but the same can be applied to the plurality of hands H3, H4 in the second arm 140.

Figure 10A:
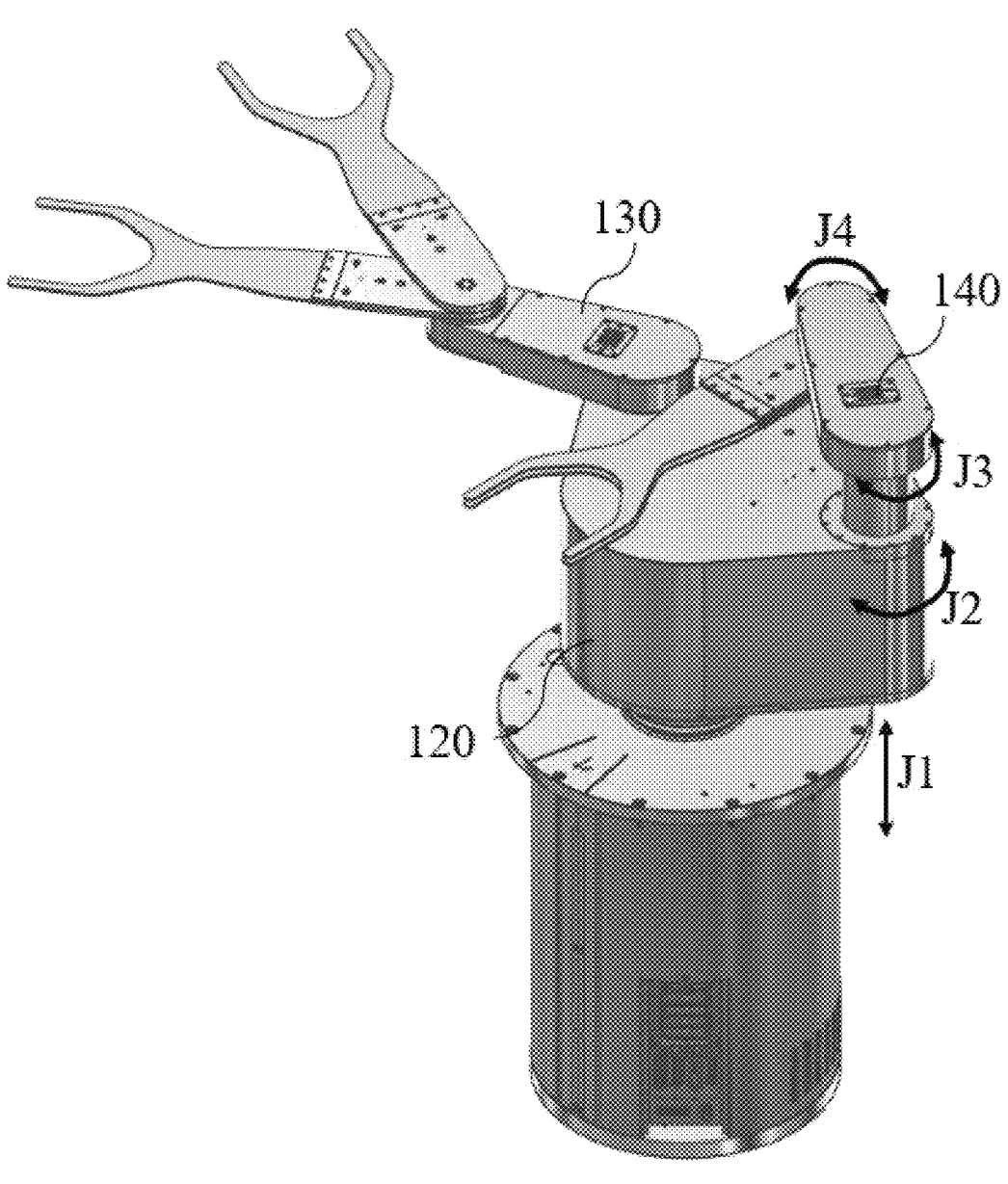
FIGS. 10A and 10B are diagrams for explaining the complex motion of the first and second articulated arms in FIG. 1.
Figure 10B:
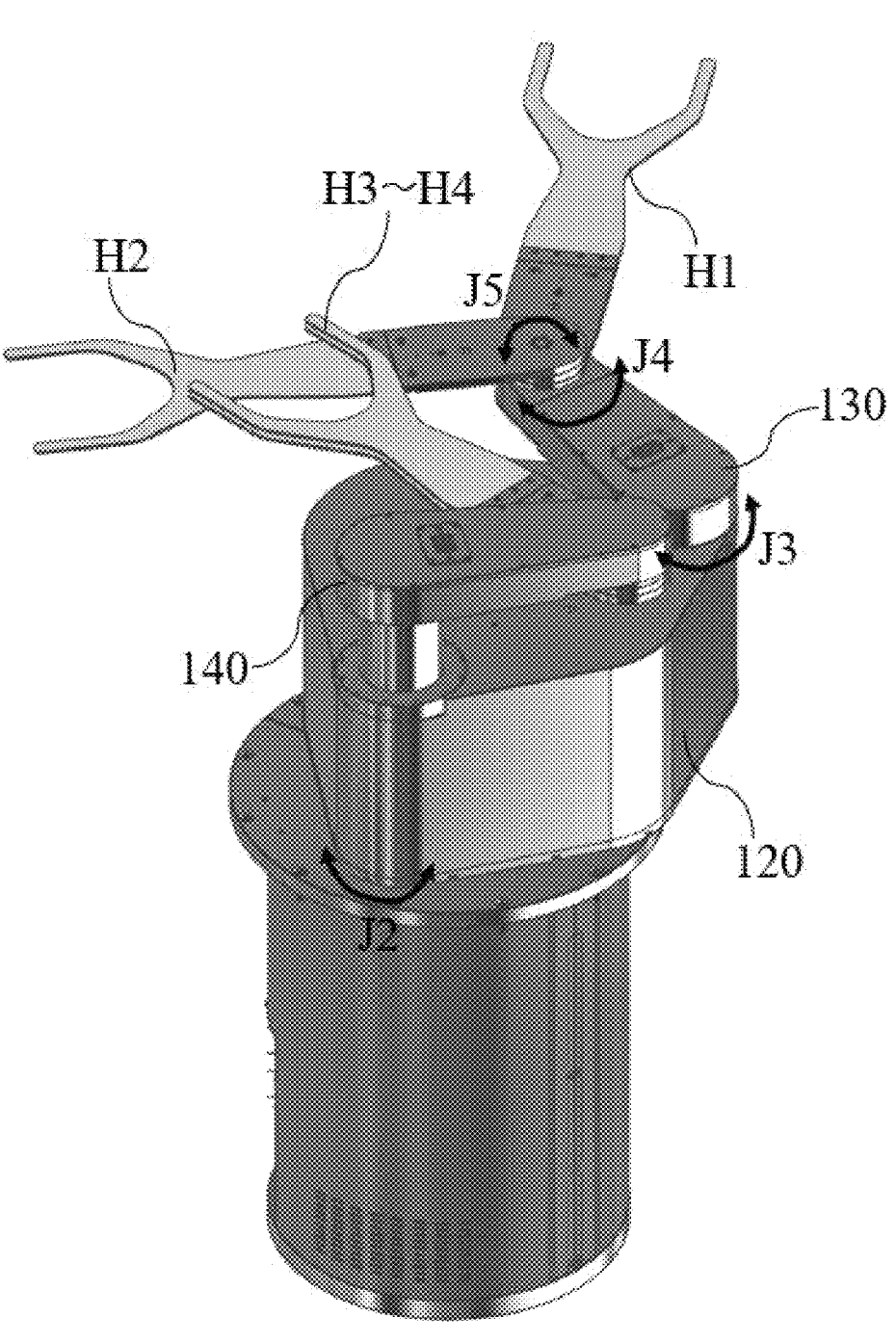

FIGS. 10A and 10B are diagrams for explaining the complex motion of the first and second articulated arms in FIG. 1.

Referring to FIGS. 10A and 10B, the first and second articulated arms 130, 140 are respectively coupled to a plurality of links at the second and third positions, and each of the plurality of links may be axially rotated to implement a complex motion. In this case, the complex motion is an operation that can be implemented with a plurality of links and may include SCARA motion and Radial motion.

As shown in FIG. 10A, the articulated work robot device 100 can implement SCARA motion through vertical linear movement J1 and common axis T rotation J2 of the bridgehead 120, and axis rotation J3, J4 of the first and second ends of each of the first and second articulated arms 130, 140. The articulated work robot device 100 can quickly and accurately transport work objects through SCARA motion and can efficiently use space in a small installation area.

As shown in FIG. 10B, the articulated work robot device 100 may implement radial motion through the axial rotation J2 of the bridgehead 120, the axial rotation J3, J4 of the first and second ends of each of the first and second articulated arms 130, 140, and the axial rotation J5 of the first and second plurality of hands H1 and H2, H3 and H4.

FIGS. 11A to 11D are diagrams showing an operation example of the articulated work robot device according to one embodiment.

As shown in FIGS. 11A to 11D, the articulated work robot device 100 may arrange the first and second articulated arms 130, 140 at opposing positions with respect to the common axis T, and independently provide joint motion power for the first and second articulated arms 130, 140 and hand motion power for the first and second plurality of hands H1 and H2, H3 and H4 to move the hands in various positions.

Figure 11A:
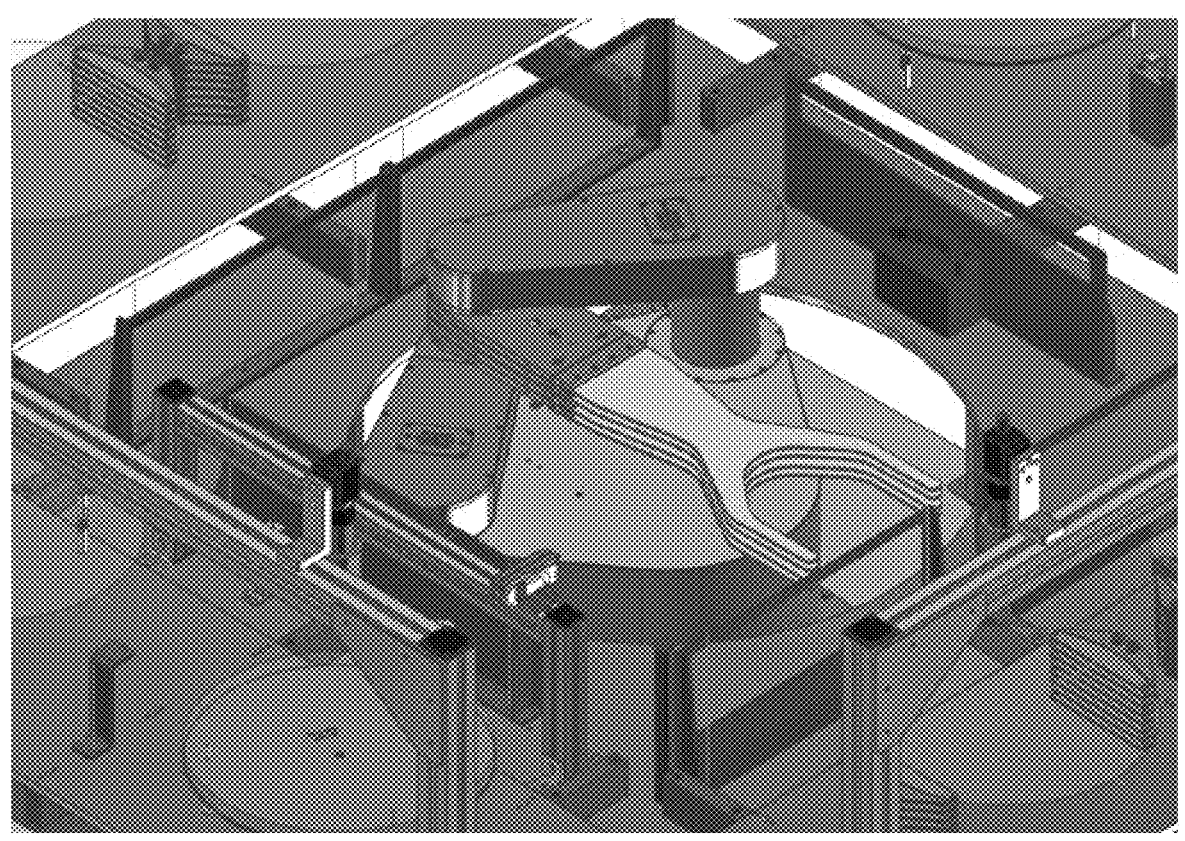
FIGS. 11A to 11D are diagrams showing an operation example of the articulated work robot device according to the present disclosure.
Figure 11B:
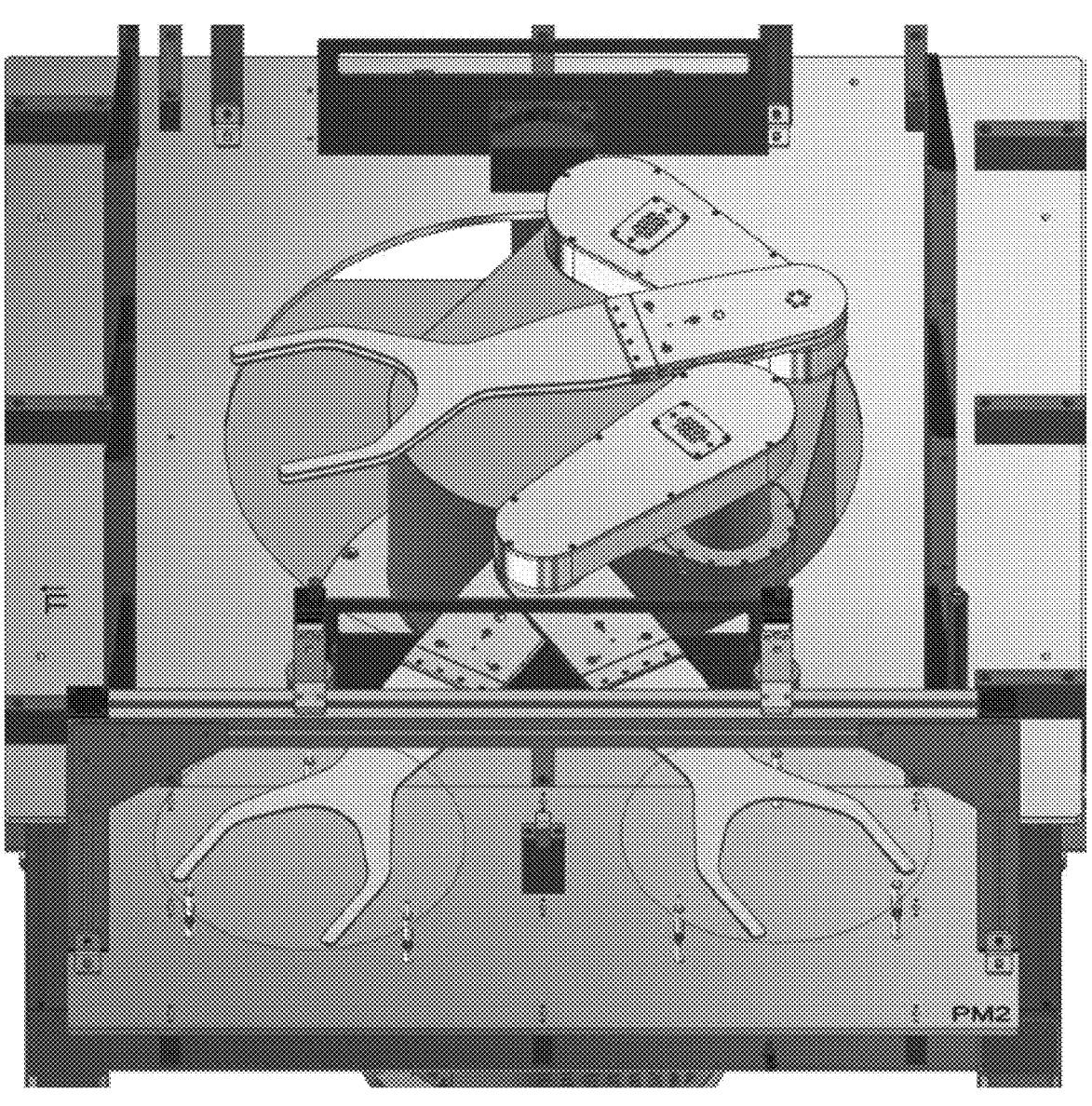
Figure 11C:
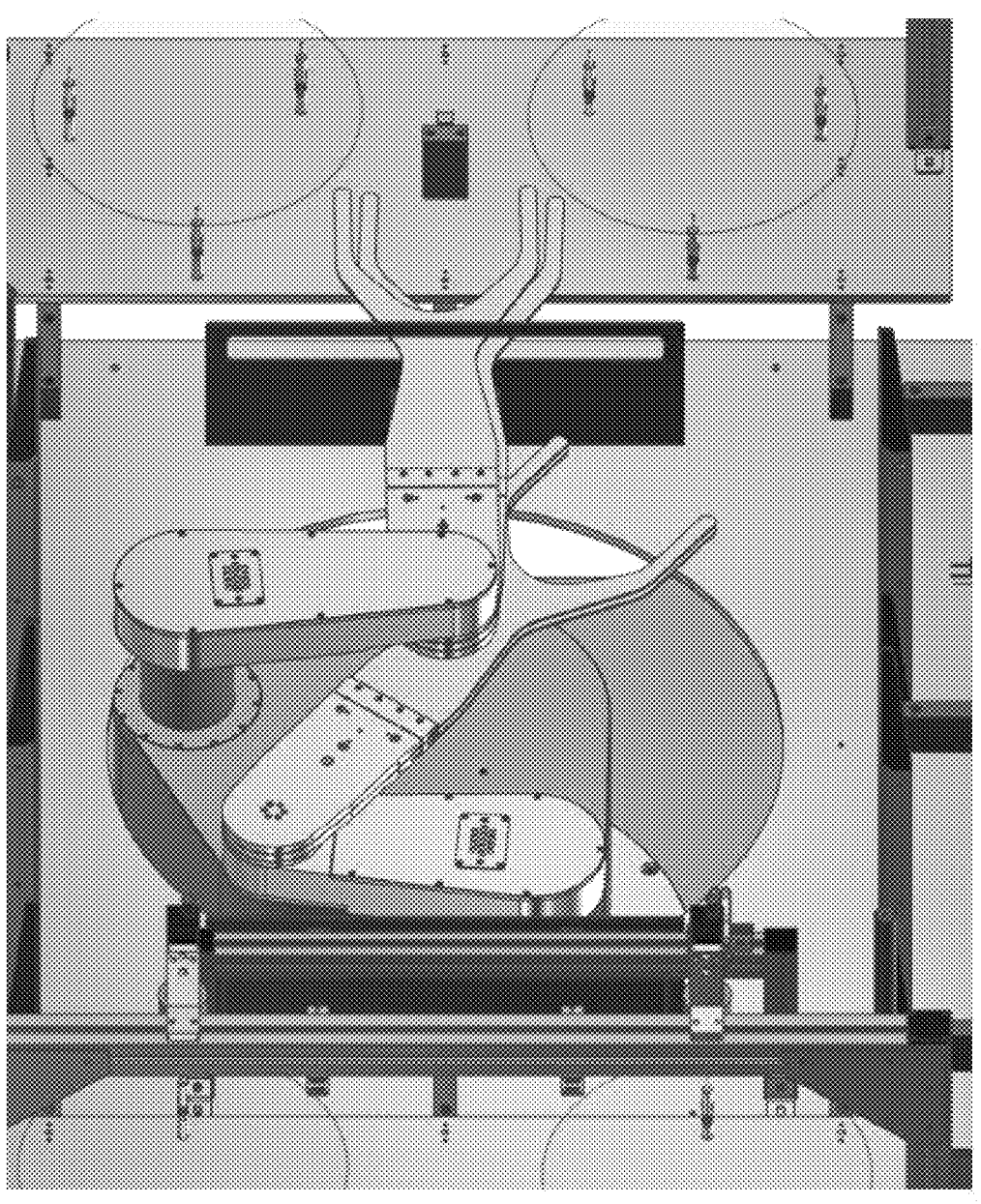
Figure 11D:
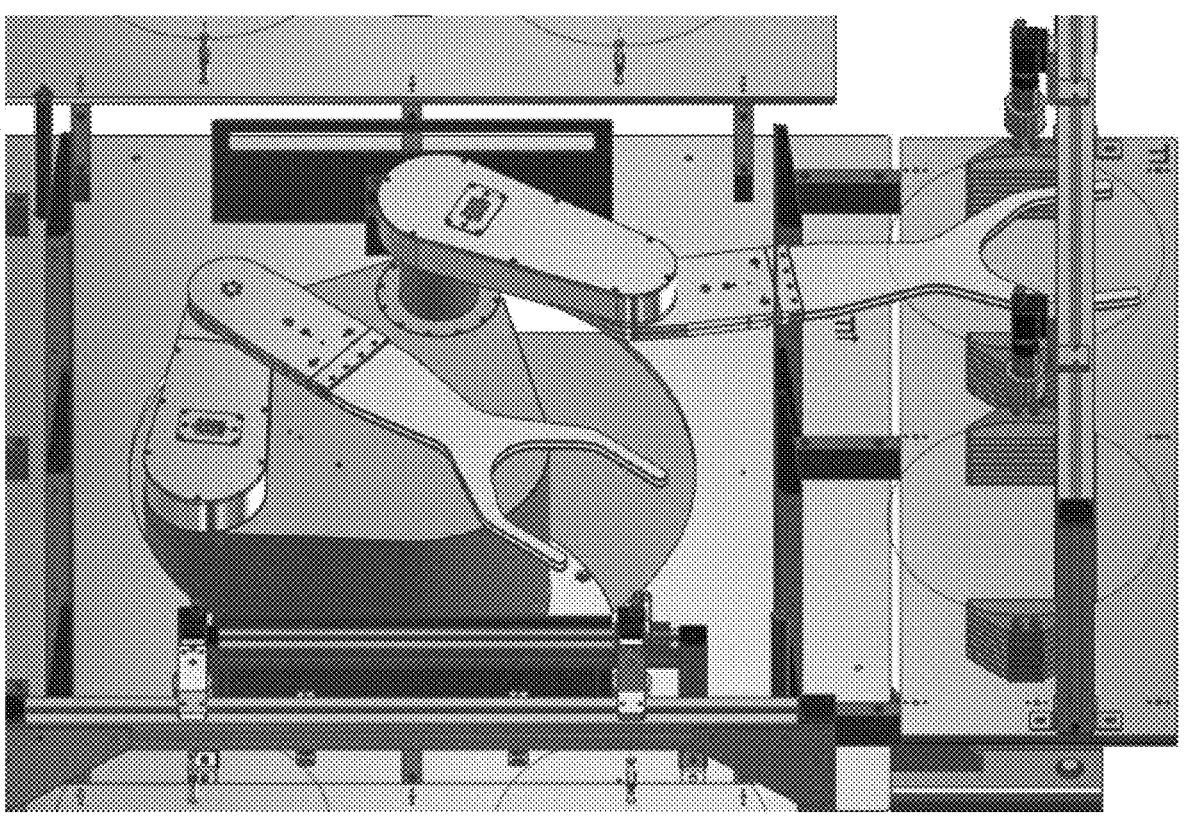

The articulated work robot device 100 may be used by overlapping the first and second plurality of hands H1 and H2, H3 and H4 on the first and second articulated arms 130, 140 up and down, as shown in FIG. 11A. Further, as shown in FIGS. 11B to 11D, the articulated work robot device 100 may rotate the bridgehead 120 and though the joint motion of one of the first and second articulated arms 130, 140 and the hand motion of the corresponding plurality of hands. move the plurality of hands. In this case, the plurality of hands on the work progressing articulated arm may be used by spreading them left and right as shown in FIG. 11B, or by overlapping them up and down as shown in FIG. 11D.

Accordingly, the articulated work robot device 100 can perform wafer transfer without specifying the location of the spatially larger and longer work chamber.

Figure 12A:
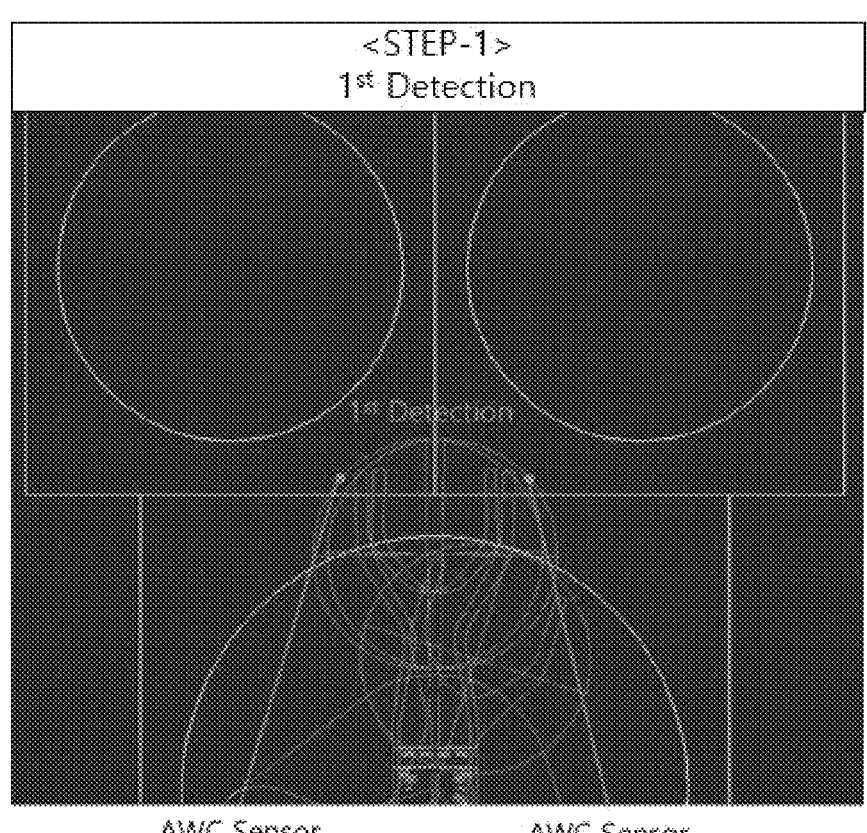
FIGS. 12A to 12C are diagrams for explaining one embodiment of a process for performing an alignment operation of the articulated work robot device according to the present disclosure.
Figure 12B:
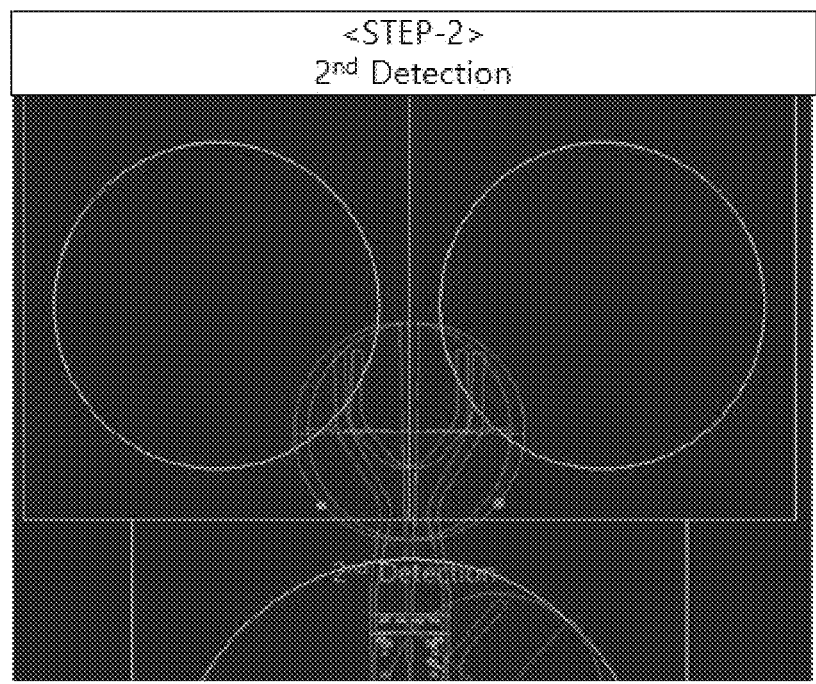
Figure 12C:
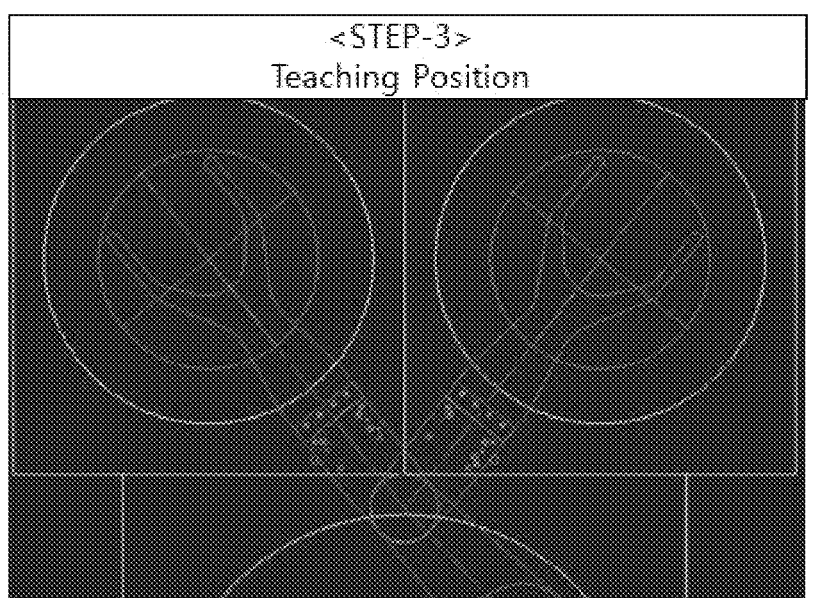

FIGS. 12A to 12C are diagrams for explaining one embodiment of a process for performing an alignment operation of the articulated work robot device according to the present disclosure.

First, as shown in FIG. 12A, in the articulated work robot device 100, in order to detect an upper wafer and a lower wafer in the plurality of hands H1, H2, the plurality of hands H1, H2 enter with each of them spread by a first angle, and primary detection is performed on the upper wafer and the lower wafer through the plurality of optical transceivers 210, 220 arranged in the entry direction. In this case, the plurality of optical transceivers 210, 220 may correspond to an AWC (Auto Wafer Centering) sensor. Then, secondary detection is performed on the upper wafer and the lower wafer during the entry process, as shown in FIG. 12B. The articulated work robot device 100 controls the rotation of the plurality of hands H1, H2 by an amount by which the wafers are misaligned based on the rotation degrees of the plurality of hands H1, H2, that is, the amount by which the hands are spread left and right with respect to the center of the entry direction and the detection time points of the wafers, to correct the misalignment of each wafer, and advances the entry of the arm 130 with the plurality of hands H1, H2 spread by a second angle to move the hands to the teaching positions, as shown in FIG. 12C.

In the articulated work robot device according to one embodiment, by providing independent motion power for each of the upper and lower body axis drives, the articulated arm drive, and the hand drive, and disposing the complex drive module that provides power in the internal space of the bridgehead, which is an arm support part, multiple wafers can be processed simultaneously in a limited space, thereby reducing the equipment area and improving workload.

The articulated work robot device according to one embodiment is capable of handling process chambers with different process times, and handling both the process chambers at the same time, or handling one process chamber whose process is completed earlier or later due to different wafer processing times.

The articulated work robot device according to one embodiment can perform a combination of various motions, such as Radial motion and SCARA motion, depending on the characteristics of the task.

The articulated work robot device according to one embodiment can reduce control errors by correcting the misalignment of the plurality of hands that can be overlapped with each other by being coupled to the common axis at one end of the arm, and the plurality of hands can quickly work objects at desired positions.

Although the present disclosure has been described above with reference to preferred embodiments, it will understood by those skilled in the art that various modifications and changes may be made to the present disclosure without departing from the idea and scope of the present disclosure as set forth in the following claims.

DESCRIPTION OF REFERENCE NUMERALS

100: articulated work robot device
110: lower body
111, 113: first and second axis control motors 112: ball screw
115: linear guide
120: bridgehead
130, 140: first and second articulated arms
131, 141: first and second scissor links
132 and 133, 142 and 143: first and second work tools
150: control unit
160, 170: first and second composite drive modules
161,171: first and second articulated control motor
162 and 163, 172 and 173: first and second plurality of hand control motors
164, 174: first and second articulated drive shaft
165, 175: first and second plurality of hand drive shafts
166, 176: first and second magnetic fluid seal
180: alignment operation performing unit
181, 182: a plurality of encoders
210, 220: a plurality of optical transceivers
H1 and H2, H3 and H4: first and second plurality of hands
T: common axis
L1 and L2, L3 and L4: first and second plurality of links
What is claimed is:

1. An articulated work robot device comprising:
a lower body;
a bridgehead coupled to a common axis at a first position of the lower body to be rotatable;
first and second articulated arms configured to be overlapped with each other up and down, and having first ends respectively disposed at second and third positions opposite to each other with respect to the common axis on the bridgehead to be rotatable together through the common axis;
first and second plurality of hands respectively coupled at second ends of the first and second articulated arms through scissor links; and first and second composite drive modules respectively disposed inside the bridgehead at the second and third positions opposite each other with respect to the common axis, each composite drive module including an articulated control motor connected to an articulated drive shaft and a plurality of hand control motors connected to a plurality of hand drive shafts to independently drive corresponding articulated arm and plurality of hands, wherein the articulated drive shaft and the plurality of hand drive shafts are enclosed by magnetic-fluid seals or vacuum-barrier thin films to maintain in a vacuum state; and
a controller configured to fold a non-working one of the first and second articulated arms toward the common axis during rotation of the bridgehead, and to simultaneously process a plurality of wafers by overlapping or spreading the plurality of corresponding hands of a working articulated arm up and down or left and right.

2. The articulated work robot device of claim 1, wherein the lower body includes:
an axis control motor for moving the common axis up and down to adjust a height of the bridgehead; and
a linear guide disposed vertically outside of the common axis to guide the up-down movement.

3. The articulated work robot device of claim 1, wherein the bridgehead arranges the first to third positions in a triangular shape.

4. The articulated work robot device of claim 1, wherein the first articulated arm operates at a lower side of the second articulated arm and independently drives the first plurality of hands at an upper or lower side of the second end.

5. The articulated work robot device of claim 1, wherein the second articulated arm operates at an upper side of the first articulated arm and independently drives the second plurality of hands at an upper or lower side of the second end.

6. The articulated work robot device of claim 1, wherein the first and second articulated arms are respectively coupled to a plurality of links at the second and third positions, and each of the plurality of links is axially rotated to implement a complex motion.

7. The articulated work robot device of claim 1, wherein the first plurality of hands are axially coupled to at an upper or lower portion of the second end of the first articulated arm up and down through a first scissor link, and are disposed at a lower side of the second plurality of hands to be driven independently.

8. The articulated work robot device of claim 1, wherein the second plurality of hands are axially coupled to at an upper or lower portion of the second end of the second articulated arm up and down through a second scissor link, and are disposed at an upper side of the first plurality of hands to be driven independently.

9. The articulated work robot device of claim 1, wherein each of the first and second plurality of hands loads or unloads a work object by fixedly coupling a work tool at a position opposite to an axis of the scissor link.

10. The articulated work robot device of claim 1, wherein the first composite drive module is driven independently of the second composite drive module, and includes:
a first articulated control motor connected to a first articulated drive shaft that provides joint motion power for the first articulated arm;
a first plurality of hand control motors connected to a first plurality of hand drive shafts that provide independent hand motion power for the first plurality of hands; and a first magnetic fluid seal or vacuum-barrier thin film, surrounding the first articulated drive shaft and the first plurality of hand drive shafts.

11. The articulated work robot device of claim 1, wherein the second composite drive module is driven independently of the first composite drive module, and includes:

a second articulated control motor connected to a second articulated drive shaft that provides joint motion power for the second articulated arm;

a second plurality of hand control motors connected to a second plurality of hand drive shafts that provide independent hand motion power for the second plurality of hands; and a second magnetic fluid seal or vacuum-barrier thin film, surrounding the second articulated drive shaft and the second plurality of hand drive shafts.

12. The articulated work robot device of claim 1, wherein the controller simultaneously processes the plurality of wafers in a first work chamber by overlapping the plurality of corresponding hands in the work progressing articulated arm of the first and second articulated arms up and down.

13. The articulated work robot device of claim 1, wherein the controller simultaneously processes the plurality of wafers in a second work chamber by spreading the plurality of corresponding hands in the work progressing articulated arm of the first and second articulated arms left and right.

14. The articulated work robot device of claim 1, wherein during a work process, the controller folds a work arm corresponding to one of the first and second articulated arms to position the work arm in the first position and unfolds the work arm to perform an articulated motion simultaneously while independently driving a plurality of work hands coupled to the work arm.

15. The articulated work robot device of claim 1, further comprising:

an alignment operation performing unit including the controller configured to correct a degree of misalignment of the plurality of hands based on rotation degrees of the plurality of hands and entry and exit time points of work objects in the plurality of hands.

16. The articulated work robot device of claim 15, wherein the alignment operation performing unit further includes:

a plurality of encoders, coupled to the common axis inside the bridgehead, for obtaining the rotation degrees of the plurality of hands; and a plurality of laser transceivers coupled to the hand control motors inside the bridgehead and disposed in an entry direction of the arm to detect the entry and exit time points of the work objects in the plurality of hands during movement of the arm.

17. The articulated work robot device of claim 16, wherein the plurality of encoders detect a rotation angle in a first direction with respect to an axis formed by a scissor link for a first hand among the plurality of hands, and detect a rotation angle in a second direction, corresponding to a direction opposite to the first direction, with respect to the axis for a second hand among the plurality of hands.

18. The articulated work robot device of claim 16, wherein a plurality of optical transceivers are disposed on both sides of a center of the entry direction of the arm, so that when the plurality of hands enter after being spread by a first angle, the plurality of hands are perpendicular to the entry direction and the plurality of optical transceivers detect the entry and exit time points of the work objects by transmitting and receiving light in a transmission and reception direction that is not necessarily perpendicular.

19. The articulated work robot device of claim 18, wherein the plurality of optical transceivers detect time points when reception of the light is interrupted as the entry time points, and detect time points when an interruption of the light reception is released and the light is received as the exit time points.

20. An articulated work robot device comprising:

a lower body;

a bridgehead coupled to a common axis at a first position of the lower body to be rotatable;

first and second articulated arms that are operated independently of each other in a work process and rotate together through the common axis;

first and second composite drive modules respectively disposed inside the bridgehead at second and third positions opposite to each other with respect to the common axis, each including an articulated control motor and a plurality of hand control motors to independently drive the corresponding articulated arm and a plurality of hands; and first and second plurality of hands respectively coupled to second ends of the first and second articulated arms through first and second links, each plurality of hands including independently operable work tools coupled to second ends of the links, the work tools being driven by corresponding composite drive module.

21. An articulated work robot device comprising:

a bridgehead coupled to a common axis at a first position of a lower body to be rotatable;

first and second plurality of hands respectively coupled through scissor links and configured to be overlapped with each other up and down;

first and second articulated arms that are disposed up and down when overlapped with each other, and have first ends coupled to second and third positions of the bridgehead, respectively, and second ends coupled to the first and second plurality of hands, respectively, to perform articulated motions; and first and second composite drive modules respectively disposed inside the bridgehead at the second and third positions opposite each other with respect to the common axis, each of the first and second composite drive modules including an articulated control motor connected to an articulated drive shaft and a plurality of hand control motors connected to a plurality of hand drive shafts to independently drive the corresponding articulated arm and plurality of hands, wherein the articulated drive shaft and the plurality of hand drive shafts are enclosed by magnetic-fluid seals or vacuum-barrier thin films to maintain in a vacuum state.

* * * * *